(12) United States Patent
Huang et al.

(10) Patent No.: US 8,488,711 B2
(45) Date of Patent: Jul. 16, 2013

(54) GEOMETRY BASED EFFICIENT DECODER FOR UNDERDETERMINED MIMO SYSTEMS AND DECODING METHOD THEREOF

(75) Inventors: Chung-Jung Huang, Hsinchu (TW); Chih-Yung Wu, Hsinchu (TW); Ta-Sung Lee, Hsinchu (TW)

(73) Assignee: National Chiao Yung University, Hsinchu (TW)

( * ) Notice: Subject to any disclaimer, the term of this patent is extended or adjusted under 35 U.S.C. 154(b) by 245 days.

(21) Appl. No.: 13/084,917

(22) Filed: Apr. 12, 2011

(65) Prior Publication Data

US 2012/0170689 A1 Jul. 5, 2012

(30) Foreign Application Priority Data

Dec. 30, 2010 (TW) .............................. 99146951 A

(51) Int. Cl.
*H04L 27/06* (2006.01)

(52) U.S. Cl.
USPC ........... 375/267; 375/260; 375/316; 375/347; 375/349; 375/346; 375/340; 375/341; 375/342

(58) Field of Classification Search
USPC .................. 375/260, 267, 316, 347, 346, 349
See application file for complete search history.

(56) References Cited

U.S. PATENT DOCUMENTS

| | | | |
|---|---|---|---|
| 7,978,798 B2 * | 7/2011 | Hwang et al. ................. | 375/349 |
| 8,223,895 B2 * | 7/2012 | Oizumi ......................... | 375/341 |
| 2010/0014606 A1 * | 1/2010 | Chen et al. .................... | 375/262 |
| 2011/0090059 A1 * | 4/2011 | Sadr ............................. | 340/10.1 |
| 2011/0216693 A1 * | 9/2011 | Amiri et al. ................... | 370/328 |
| 2012/0159122 A1 * | 6/2012 | Anderson et al. .............. | 712/31 |

OTHER PUBLICATIONS

Kai-Kit Wong, List Slab-Sphere Decoding: Efficient High-Performance Decoding for Asymmetric MIMO Antenna Systems, 2005.*
Kai-Kit Wong, Efficient High-Performance Decoding for Overloaded MIMO Antenna Systems, 2007.*

* cited by examiner

*Primary Examiner* — Siu Lee
(74) *Attorney, Agent, or Firm* — Wang Law Firm, Inc.; Li K. Wang; Stephen Hsu

(57) ABSTRACT

A decoder for underdetermined MIMO systems with low decoding complexity is provided. The decoder consists of two stages: 1. Obtaining all valid candidate points efficiently by slab decoder. 2. Finding the optimal solution by conducting the intersectional operations with dynamic radius adaptation to the candidate set obtained from Stage 1. A reordering strategy is also disclosed. The reordering can be incorporated into the proposed decoding algorithm to provide a lower computational complexity and near-ML decoding performance for underdetermined MIMO systems.

7 Claims, 5 Drawing Sheets

GEOMETRY BASED EFFICIENT DECODER FOR UNDERDETERMINED MIMO SYSTEMS AND DECODING METHOD THEREOF

BACKGROUND OF THE INVENTION

1. Field of the Invention

The exemplary embodiment(s) of the present invention relates to a field of decoder for underdetermined MIMO systems. More specifically, the exemplary embodiment(s) of the present invention relates to a geometry based efficient decoder for underdetermined MIMO systems and a decoding method thereof.

2. Description of Related Art

Recently, in order to satisfy the growing demands of the personal communications, the design of next generation wireless communication systems goes for supporting high data rate and high mobility. However, the link quality suffers from frequency selective and time selective fading caused by multipath propagation in wireless channels. Moreover, the quality and reliability of wireless communication are degraded by Doppler shift and carrier frequency/phase. Beside, due to the limited available bandwidth and transmitted power, the design challenge of wireless communication systems becomes more difficult. Therefore, many innovative techniques have been devised and extensively used in this field to improve the reliability and the spectral efficiency of wireless communication links e.g. the coded multicarrier modulation, smart antenna and multiple-input multiple-output (MIMO) technology and adaptive modulation.

Among these technologies, MIMO is the most outstanding one. MIMO technology involves the use of multiple antennas to improve link performance. There are two major features of MIMO technologies: spatial multiplexing for increasing data rate and spatial diversity for improve link quality. Spatial multiplexing offers a linear increasing of data rate by transmitting multiple independent data streams at the same time. Spatial diversity provides diversity gain to mitigate fading effects by using the multiple (ideally independent) copies of the transmitted signal in space, time and frequency. They are usually trade-offs to each other and provide an effective and promising solution while achieving high-data rate and reliable transmission.

The major MIMO signal detection schemes include linear detection, successive interference cancellation (SIC) and the maximum-likelihood (ML) detection. The advantages of the first two detection schemes are low decoding complexity and easy implementation but their detection performances are non-optimal. ML detection provides optimal detection performance but its complexity increases exponentially with the size of constellation and the number of transmit antennas. Therefore, the design of high-performance and low decoding complexity is the one of key issues of MIMO designs. To reduce the complexity of the ML detector, the sphere decoding algorithm (SDA) has received considerable attention as an efficient detection scheme for MIMO systems. However, typical SDA fail to work in underdetermined MIMO systems where the number of transmit antennas is larger than the number of receive antennas.

To overcome the above drawbacks of typical SDA, the conventional generalized sphere decoder (GSD), double-layer sphere decoder (DLSD) and slab sphere decoder (SSD) are introduced. These decoders transform underdetermined systems into overdetermined systems that can be solved by the SDA. Since the GSD performs an exhaustive search on $(N_t-N_r)$ dimensions for the ML solution, the decoding complexity is increasing with the size of constellation and the antenna number difference. The DLSD uses the outer sphere decoder to find the valid candidate points and then the inner sphere decoder uses those points to find the solution. The SSD uses the geometry concept to find the valid candidate points to reduce the searching complexity of DLSD. However, the SDA still needs to be performed too many times in SSD.

SUMMARY OF THE INVENTION

A decoder for underdetermined MIMO systems with low decoding complexity is provided. The decoder consists of two stages: 1. Obtaining all valid candidate points efficiently by slab decoder. 2. Finding the optimal solution by conducting the intersectional operations with dynamic radius adaptation to the candidate set obtained from Stage 1. A reordering strategy is also disclosed. The reordering can be incorporated into the proposed decoding algorithm to provide a lower computational complexity and near-ML decoding performance for underdetermined MIMO systems.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a geometry based efficient decoder for underdetermined MIMO systems and a decoding method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

According to embodiments of the invention, a decoder for underdetermined MIMO systems with low decoding complexity is provided. The decoder consists of two stages. The first stage involves steps for obtaining all valid candidate points efficiently by slab decoder. The second stage involves steps for finding the optimal solution by conducting the intersectional operations with dynamic radius adaptation to the candidate set obtained from the first stage.

Additionally, a reordering strategy (preprocessing) that can be incorporated into the inventive decoding algorithm to provide a lower computational complexity and near-ML decoding performance for underdetermined MIMO systems is also provided.

Stage 1

Figure 1:
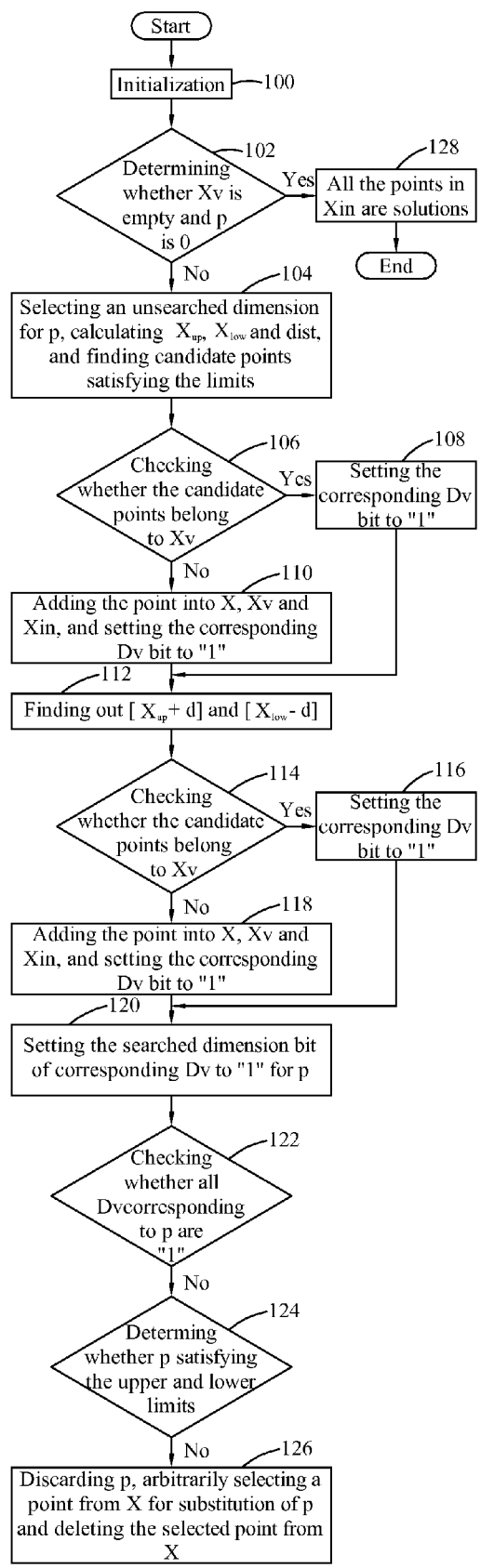
FIG. 1 is a flowchart showing the steps of the first stage of the geometry based efficient decoding algorithm for underdetermined MIMO systems according to one embodiment of the invention.

FIG. 1 is a flowchart showing the steps of the first stage of the geometry based efficient decoding algorithm for underdetermined MIMO systems according to one embodiment of the invention. It is similar to the PDA and SLA, but only one algorithm is used to find those points that fall inside the slab, so no constellation points and dimensions are multiply searched.

Consider a Gaussian MIMO system with $N_t$ transmit antennas and $N_r$ receive antennas. The relation between transmitted signal vectors and received signal vectors can be written as $$\tilde{y} = \tilde{H}\tilde{x} + \tilde{n}, \qquad (1)$$

where $\tilde{y}=[\tilde{y}_1, \tilde{y}_2, \ldots \tilde{y}_{Nr}] \in C^{Nr \times 1}$ stands for the received signal vector, $\tilde{x}=[\tilde{x}_1, \tilde{x}_2, \ldots, \tilde{x}_{Nt}] \in C^{Nt \times 1}$ stands for the transmitted signal vector, $\tilde{H}$ stands for the frequency-flat fading channel matrix:

$$\tilde{H} = \begin{bmatrix} \tilde{h}_{1,1} & \tilde{h}_{1,2} & \ldots & \tilde{h}_{1,Nt} \\ \tilde{h}_{2,1} & \tilde{h}_{2,2} & \ldots & \tilde{h}_{1,Nt} \\ \vdots & \vdots & \ddots & \vdots \\ \tilde{h}_{Nr,1} & \tilde{h}_{Nr,2} & \ldots & \tilde{h}_{Nr,Nt} \end{bmatrix} \in C^{Nt \times Nt}, \qquad (2)$$

where the elements of $\tilde{H}$ are complex i.i.d. Gaussian random variables with normal distribution $CN(0,1)$ and $\tilde{n}=[\tilde{n}_1, \tilde{n}_2, \ldots, \tilde{n}_{Nr}] \in C^{Nr \times 1}$ stands for the complex additive white Gaussian noise (AWGN) with normal distribution $CN(0,\sigma^2 I)$. It is assumed $N_t > N_r$ for an underdetermined MIMO systems.

The complex equation in (1) can be rewritten into an equivalent real system by real value decomposition as $$y = Hx + n \qquad (3)$$

where $$y = [Re\{\tilde{y}\}^T Im\{\tilde{y}\}^T] \in R^M$$

$$x = [Re\{\tilde{x}\}^T Im\{\tilde{x}\}^T] \in R^N,$$

$$n = [Re\{\tilde{n}\}^T Im\{\tilde{n}\}^T] \in R^M \qquad (4)$$

and $$H = \begin{bmatrix} Re\{\tilde{H}\}^T & -Im\{\tilde{H}\}^T \\ Im\{\tilde{H}\}^T & Re\{\tilde{H}\}^T \end{bmatrix} \in R^{M \times N}, \qquad (5)$$

where $M=2N_r$ and $N=2N_t$. The ML estimator $\hat{x}$ of x is obtained by minimizing the Euclidean distance of y from the legal lattice points as $$\hat{x} = \underset{x \in Z^N}{\operatorname{argmin}} \|y - Hx\|^2 = \underset{x \in Z^N}{\operatorname{argmin}} \|R(\rho - x)\|^2, \qquad (6)$$

where $Z=\{-3, -1, 1, 3\}$ for 16-QAM cases for examples, $\rho = H^T(HH^T)^{-1}y$, Q is a M×M unitary matrix, and R is a M×N upper triangular matrix corresponding to the QR-decomposition of H, i.e., H=QR. To obtain $\hat{x}$ in equation (6) efficiently, an algorithm should be provided to solve a search problem that finds all the lattice points satisfying $$\|y - Hx\|^2 \leq C^2 \qquad (7)$$

for a given radius C (>0). Substituting H=QR into the equation (7) results in $$\|y' - Rx\|^2 \leq C^2, \qquad (8)$$

where $y' = Q^T y$. If N>M, then $$-C \leq y'_M - [r_{M,M} x_M + \ldots + r_{M,N} x_N] \leq C, \qquad (9)$$

at the M-th layer. Equation (9) involves N−M+1 dimensions for detection. The algorithm aims to find those points that fall inside the slab, i.e., satisfy the equation (9).

First, consider a slab having an equation $$\left| \sum_{i=1}^{N} w_i x_i - y \right| \leq C.$$

The main idea of the algorithm is to find those points satisfying the equation.

Define X as a set of points to be searched, $X_V$ as a set of searched points, and $X_{in}$ as a set of points satisfying the search criteria, wherein the initial values of all the three sets are empty. Each candidate points has a corresponding vector $D_v$ wherein each element is a binary digit, and "1" represents its corresponding dimension is searched and "0" represents unsearched. Initially, each candidate point corresponds to a vector $D_v=[0,0,\ldots,0] \in \mathbb{Z}^N$, i.e., all the corresponding dimensions are unsearched. p is a temporary variable and has a value $p=[p_1\ p_2\ \ldots\ p_N]^T \in \mathbb{R}^N$, i.e., it is a starting point for current search.

For each candidate point, a distance between the point and the slab $$y = \sum_{i=1}^{N} w_i x_i$$

is defined as dist=$|\Sigma_{i=1}^{N} w_i x_i - y|$.

In the step 100, initialization is performed. A point is arbitrarily selected as an initial point $x_{int}=[x_1^{int}\ x_2^{int}\ \ldots\ x_N^{int}]^T \in \mathbb{R}^N$ and $X=x_{int}$. Then, it is stored in p and deleted from X.

In the step 102, it is determined whether $X_V$ is empty and p is 0. If yes, the procedure goes to the step 128, wherein all the points in $X_{in}$ and their corresponding distances are the solutions. Otherwise, in the step 104, a value of k representing an unsearched dimension of the point is arbitrarily selected. The kth element in its corresponding vector $D_V$ is "0". Then, the following is calculated:

$$x_{k,up} = p_k - \frac{\Delta y(p)}{w_k} + C,$$

$$x_{k,low} = p_k - \frac{\Delta y(p)}{w_k} - C.$$

where $$\Delta y(p) = \sum_{i=1}^{N} w_i p_i - y.$$

According to the calculated results of $x_{k,up}, x_{k,low}$, all the legitimate points between them are derived. In the step 106, it is determined whether the derived candidate points exists in $X_V$. If no, the point is added into X, $X_V$ and $X_{in}$ in the step 110, and the kth element of their corresponding vector $D_V$ is set to "1". Its corresponding distance can be calculated from previously derived value of $\Delta y(\bullet)$.

In the step 112, candidate points $\lfloor x_{k,up}+d \rfloor, \lceil x_{k,low}-d \rceil$ are derived according to $x_{k,up}, x_{k,low}$, which are the points outside the upper and lower limits but nearest to the slab. d is the smallest distance between the points. In the step 114, it is determined whether these points exist in $X_V$. If no, the points are added into X and $X_V$ in the step 118, and the kth element of the corresponding vector $D_V$ is set to "1". Otherwise, in the step 116, only the kth element of the corresponding vector $D_V$ is set to "1". It is noted that the value of dist is not required here.

Now, since the search starting from the point p in the kth direction is completed, the kth element of the corresponding vector $D_V$ is set to "1" in the step 120.

In the step 122, it is determined: (a) whether all the elements of the corresponding vector $D_V$ are "1", if yes, the procedure goes to the step 126, otherwise, it is determined further in the step 124: (b) whether p satisfies the current search criteria, if no, the procedure goes to the step 126, otherwise, it goes back to the step 102. In the step 126, a candidate point is arbitrarily selected for substitution of the current point p and deleted from X.

Finally, by iterating the above procedure, each point x in $X_{in}$ falls in the slab. The above search algorithm can efficiently find the valid candidate points satisfying (9) for a given C. Conventional underdetermined decoders use all those points to find the optimal solution by the SDA. when the radius of constraints is not large. However, as described above, the decoding complexity is closely related to the number of candidate points. The number of candidate points derived from the above search algorithm will be still large in case of large antenna number difference and/or large constellation. Therefore, according to embodiments of the invention, instead of using SDA, the optimal solution is derived by conducting the intersectional operations with dynamic radius adaptation, which will be explained below.

Stage 2

Figure 2:
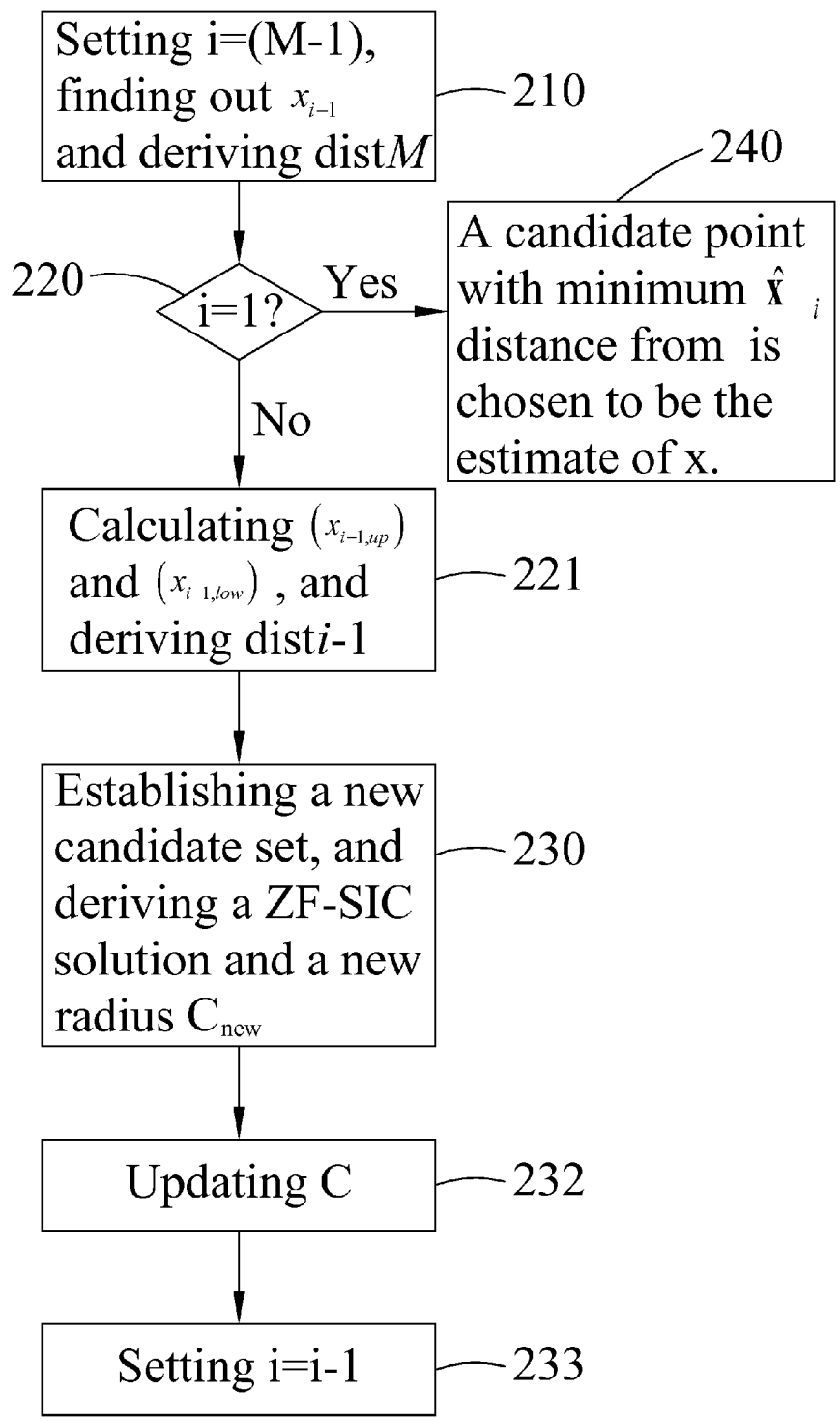
FIG. 2 is a flowchart showing the steps of the second stage of the geometry based efficient decoding algorithm for underdetermined MIMO systems according to one embodiment of the invention.

FIG. 2 is a flowchart showing the steps of the second stage of the geometry based efficient decoding algorithm for underdetermined MIMO systems according to one embodiment of the invention. The equation (8) can be rewritten and expanded as the summation form as follows:

$$\left\| \begin{bmatrix} y_1' \\ \vdots \\ y_{M-1}' \\ y_M' \end{bmatrix} - \begin{bmatrix} r_{1,1} & r_{1,2} & \ldots & r_{1,M-1} & r_{1,M} & \ldots & r_{1,N} \\ 0 & \ddots & \ddots & \ddots & \ddots & \ddots & \vdots \\ 0 & \ldots & 0 & r_{M-1,M-1} & r_{M-1,M} & \ldots & r_{M-1,N} \\ 0 & \ldots & 0 & 0 & r_{M,M} & \ldots & r_{M,N} \end{bmatrix} \begin{bmatrix} x_1 \\ x_2 \\ \vdots \\ x_N \end{bmatrix} \right\|^2 \leq \quad (11)$$

$$C^2 \Rightarrow \sum_{i=1}^{M} \left[ y_i' - \sum_{j=i}^{N} r_{ij} x_j \right]^2 \leq C^2$$

The total number of slab equations included in (11) is M. These equations can be written with corresponding IDs as follows:

(12)

| Slab equations ID | Slab equations |
|---|---|
| Slab M | $-C \leq y_M' - [r_{M,M} x_M + \ldots + r_{M,N} x_N] \leq C$ |
| $\vdots$ | $\vdots$ |
| Slab 2 | $-C \leq y_2' - [r_{2,2} x_2 + \ldots + r_{2,N} x_N] \leq C$ |
| Slab 1 | $-C \leq y_1' - [r_{1,1} x_1 + \ldots + r_{1,N} x_N] \leq C$ |

In the SSD, only the last slab equation (Slab M) is used. However, the total available number of slab equations is M in (12). Thus, in order to achieve a lower decoding complexity, the main idea of the inventive method is to utilize all the available slab equations to find the candidate set, instead of only using Slab M.

With reference to FIG. 2, i is set as M and the initial candidate set $(\hat{x}_M)$ is found by Slab M equation $-C \leq y_M' - \lfloor r_{M,M} x_M + \ldots + r_{M,N} x_N \rfloor \leq C$ in the step 210. The corresponding distance $(dist_M)$ can be obtained by the search algorithm in the stage 1.

In the step 220, It is determined whether i=1. If it is true, the procedure goes to the step 240. Otherwise, in the step 221, the upper bound $(x_{i-1,up})$ and lower bound $(x_{i-1,low})$ of $x_{i-1}$ corresponding to each candidate point of candidate set will be found by the radius constraint $$D_{i,i-1} = \left\| \begin{bmatrix} y_{i-1}' \\ y_i' \end{bmatrix} - \begin{bmatrix} r_{i-1,i-1} & r_{i-1,i} & \ldots & r_{i-1,N} \\ 0 & r_{i,i} & \ldots & r_{i,N} \end{bmatrix} \begin{bmatrix} x_{i-1} \\ x_i \\ \vdots \\ x_N \end{bmatrix} \right\|^2 \leq C^2,$$

and $$x_{i-1,up} = \frac{\sqrt{C^2 - (dist_i)^2} + \left( y_{i-1}' - \sum_{j=i}^{N} r_{i-1,j} x_j \right)}{r_{i-1,i-1}},$$

$$x_{i-1,low} = \frac{-\sqrt{C^2 - (dist_i)^2} + \left( y_{i-1}' - \sum_{j=i}^{N} r_{i-1,j} x_j \right)}{r_{i-1,i-1}}$$

Therefore, $dist_{i-1}$ can be easily found by $$dist_{i-1}^2 = \left(y'_{i-1} - \sum_{j=i-1}^{N} r_{i-1,j} x_j\right)^2 + (dist_i)^2.$$

In the step 230, using the upper and lower bounds corresponding to each candidate point, the new candidate set $(\hat{x}_i)$ can be constructed by $$\hat{x}_{i-1} = ([x_{i-1,low}, x_{i-1,up}] \cap Z, x_i, \ldots, x_N].$$

A candidate point with minimum distance from $\hat{x}_i$ is chosen and its ZF-SIC solution is obtained. Then, a new radius ($C_{new}$) is derived. In the step 231, C is updated according to $C_{new}$ and an internal controlled variable "state" having an initial value of "increment" according to the following rule:

|  | "state" = increment | "state" = decrement |
|---|---|---|
| $C_{new} > C$ | Add an increment to C and keep "state" = increment | Both C and "state" are unchanged |
| $C_{new} \leq C$ | Set C = $C_{new}$ and "state" = decrement | Set C = $C_{new}$, and keep "state" = decrement |

In the step 233, i is set as i−1 and the procedure goes to the step 220.

In the step 240, a candidate point with minimum distance from $\hat{x}_i$ is chosen to be the estimate of x.

It should be noted that C is increased if the initial candidate set $(\hat{x}_M)$ is empty, and that the ZS-SIC solution is used as the estimate of x if the candidate set $(\hat{x}_i, 1 \leq i \geq M-1)$ is empty.

Preprocessing

In underdetermined MIMO systems, the channel matrix is preprocessed with some techniques, which can reduce the decoding complexity or improve the performance of the SDA. There are many preprocessing techniques such as lattice reduction, column permutation, and scaling. However, we cannot apply these preprocessing techniques to reduce the decoding complexity in the decoder for the underdetermined MIMO systems of the present invention. As previously described, the primary decoding complexity results from the intersection of candidate sets. Therefore, it is desired that the procedure of intersection is executed as few times as possible.

First, the number of candidate points ($N_p$) inside the initial slab is defined as an index of decoding complexity. Therefore, the $N_p$ is expected to be as small as possible. We rewrite the initial slab form as $$-C \leq y'_M - [r_{M,M} x_M + \ldots + r_{M,N} x_N] \leq C. \quad (13)$$

Figure 3:
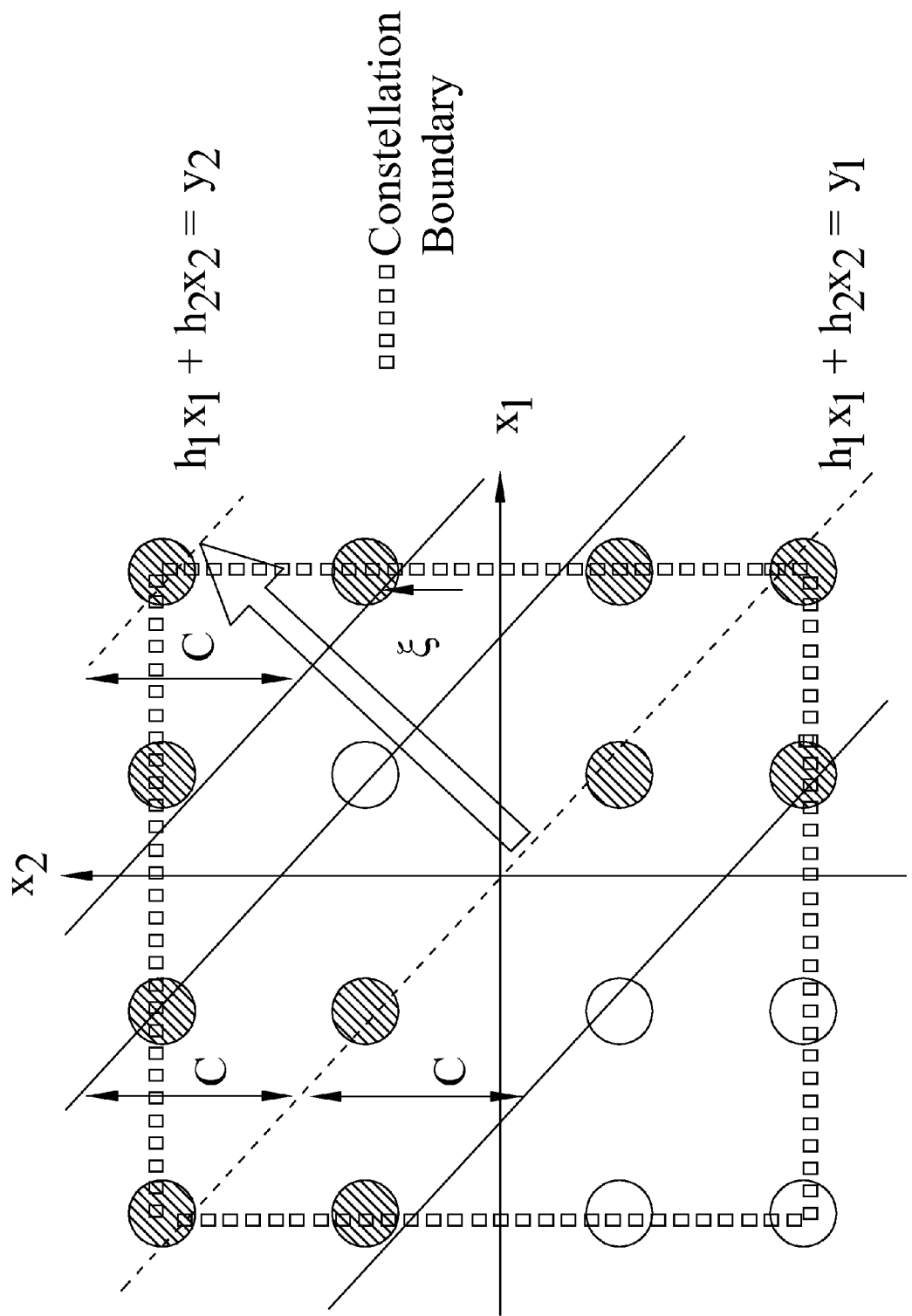
FIG. 3 illustrates a geometrical diagram of slabs with different y.

The initial slab candidates can be found by channel columns reordering, and the number of the candidates is C (N,N −M+1). Choosing the initial slab from the candidates is important for the inventive decoder. Geometrically speaking, $|y'_M|$ represents the distance from the origin to the slab, as shown in FIG. 3. It is assumed that the slab equation form is $h_1 x_1 + h_2 x_2 = y$, where $h_1$ is a constant and y is a variable, and $|y'_M|$ is defined as the location index of slab ($\xi$). As shown in FIG. 3, $N_p$ is small when $\xi$ is large. Therefore, the slab with the maximum $\xi$ will be chosen to be the initial slab.

Figure 4:
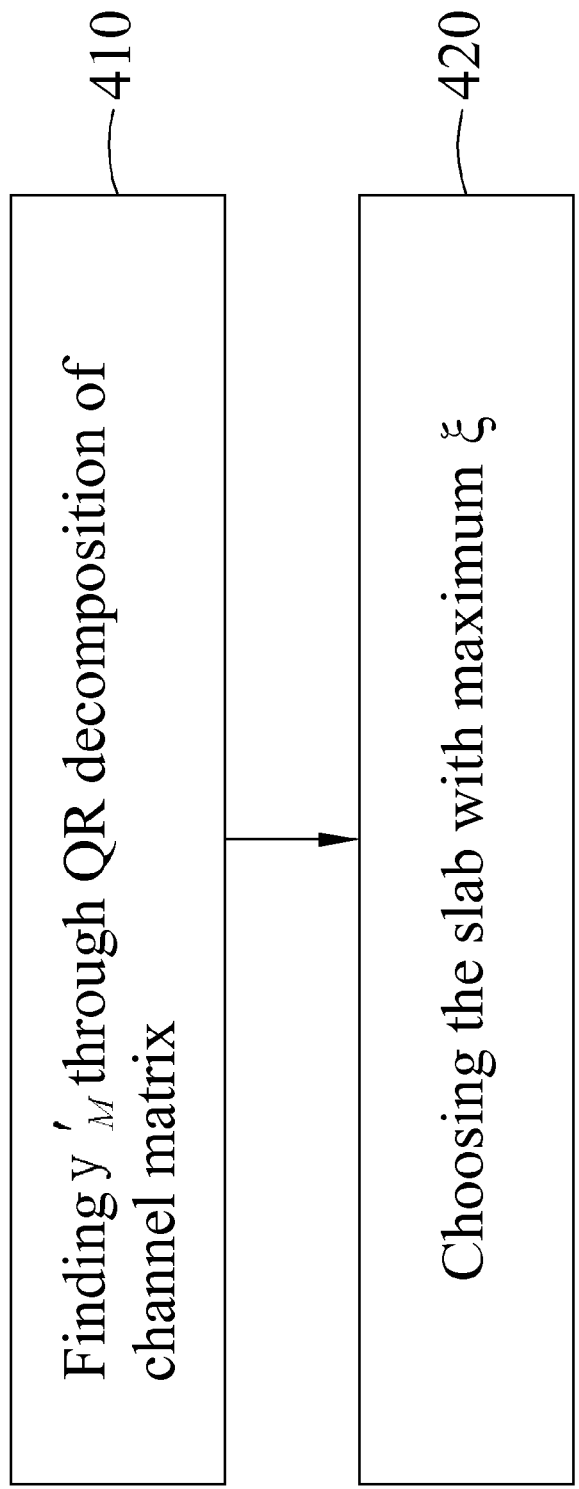
FIG. 4 is a flowchart showing the preprocessing in the geometry based efficient decoding algorithm for underdetermined MIMO systems according to one embodiment of the invention.

FIG. 4 is a flowchart showing the preprocessing in the geometry based efficient decoding algorithm for underdetermined MIMO systems according to one embodiment of the invention. y' of the equation (8) can be rewritten as $$y' = [y'_1 y'_2 \ldots y'_M]^T = [\vec{q}_1^T y \vec{q}_2^T y \ldots \vec{q}_M^T y]^T \in R^M, \quad (14)$$

where $Q = [\vec{q}_1 \ \vec{q}_2 \ldots \vec{q}_M] \in R^{M \times M}$. In order to obtain $y'_M$, $\vec{q}_M$ is computed. Since different reorderings of channel columns result in different $\vec{q}_M$, the problem becomes how to find $\vec{q}_M$ efficiently. The channel column reordering is formed as HP, where P is a permutation matrix.

In the step 410, since P=I, HP=H=$[\vec{h}_1 \ \vec{h}_2 \ldots \vec{h}_N]$. QR decomposition of the HP is given as:

$$V_1 H = \begin{bmatrix} T_1 & A \\ 0 & \tilde{H}_1 \end{bmatrix}, \quad (15)$$

where $V_1$ is M×M Householder matrix of the first column vector of H, $T_1$ is a scalar and $\tilde{H}_1 = V_1[2:M, 1:M]H[1:M, 2:M]$. Then, a new matrix is defined as $\tilde{H}_1 \in R^{M-1 \times M-1}$ to perform the same procedure as:

$$V_2 \tilde{H}_1 = \begin{bmatrix} T_2 & A \\ 0 & \tilde{H}_2 \end{bmatrix}, \quad (16)$$

where $V_2$ is (M−1)×(M−1) Householder matrix of the first column vector of $\tilde{H}_1$, $T_2$ is a scalar and $\tilde{H}_2 = V_2[2:M-1, 1:M-1]\tilde{H}_1[1:M-1, 2:M-1]$. And so on, the QR composition of H is obtained as:

$$Q^T H = R, \quad (17)$$

where $$Q^T = \begin{bmatrix} \vec{q}_1^T \\ \vec{q}_2^T \\ \vdots \\ \vec{q}_M^T \end{bmatrix} = U_{M-1} \ldots U_2 U_1$$

and $$U_i = \begin{bmatrix} I & 0 \\ 0 & V_i \end{bmatrix}.$$

Since $\vec{q}_M$ is the only one to be considered, only the last row of $U_{M-1}$ is computed to yield to the following:

$$\begin{bmatrix} \otimes \\ \vdots \\ \otimes \\ \vec{q}_M^T \end{bmatrix} = \begin{bmatrix} I & 0 & 0 \\ 0 & \otimes & \otimes \\ 0 & V_{M-1(2,1)} & V_{M-1(2,2)} \end{bmatrix} \Omega_1, \quad (17)$$

where $\Omega_1 = U_{M-2} \ldots U_1$. To avoid unnecessary computations, only the last two rows of $\Omega_1$ is considered. Therefore, the last two rows of $U_{M-2}$ is computed as $$\Omega_1 = \begin{bmatrix} I & 0 & 0 & 0 \\ 0 & \otimes & \otimes & \otimes \\ 0 & V_{M-2(2,1)} & V_{M-2(2,2)} & V_{M-2(2,3)} \\ 0 & V_{M-2(3,1)} & V_{M-2(3,2)} & V_{M-2(3,3)} \end{bmatrix} \Omega_2,$$

where $\Omega_2 = U_{M-3} \ldots U_1$. By iterating this procedure, $\vec{q}_M$ with P=I is obtained. From the equation (14), $y'_M$ can be found accordingly.

In the step 420, $y'_M$ of another order of channel columns is found quickly after the step 410 is performed. For example, assuming that the order of channel columns is to exchange $\vec{h}_{M-1}$ and $\vec{h}_M$ as $[\vec{h}_1 \ldots \vec{h}_M \vec{h}_{M-1} \vec{h}_{M+1} \ldots \vec{h}_N]$. It is observed that only $U_{M-1}$ is required to be computed. This concept can be used to find $y'_{M-1}$ of other orderings of the channel columns. Finally, the slab from the candidates with the maximum $\xi$ is chosen to be the initial slab.

The previously described preprocessing scheme is to perform an exhaustive search for all $\xi$. Therefore, the computational complexity is large when the number of candidates (C(N,N −M+1)) is large. In another embodiment of the invention, an alternative approach of preprocessing is provide to avoid the exhaustive search.

Figure 5:
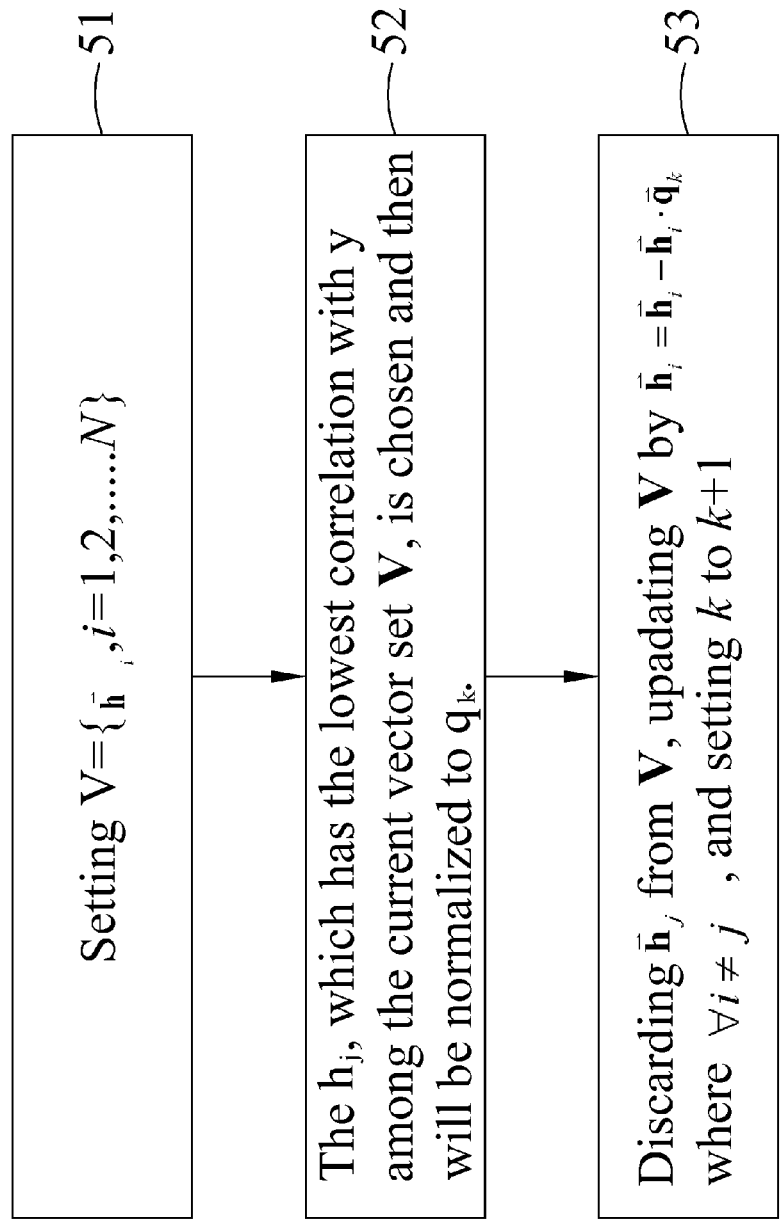
FIG. 5 is a flowchart showing the preprocessing in the geometry based efficient decoding algorithm for underdetermined MIMO systems according to another embodiment of the invention.

FIG. 5 is a flowchart showing the preprocessing in the geometry based efficient decoding algorithm for underdetermined MIMO systems according to another embodiment of the invention. In the step 51, initialization of the vector set $V=\{\vec{h}_i, i=1,2,\ldots N\}$ and the parameter k=1 is performed. In the step 52, The $\vec{h}_j$, which has the lowest correlation with y among the current vector set V, is chosen and then will be normalized to $\vec{q}_k$. In the step 53, $\vec{h}_j$ is discarded from V, V is then updated by $\vec{h}_i = \vec{h}_i - \vec{h}_i \cdot \vec{q}_k$ where $\forall i \neq j$ and k is set to k+1. The procedure goes to the step 52 till $\vec{q}_M$ is found. Finally, $r_{jk}$ is computed by $r_{jk} = \vec{q}_j \cdot \vec{h}_k$ where $j=1,2,\ldots,k-1$ to obtain the QR decomposition of the reordering H.

Simulations demonstrate that the inventive decoding algorithm has a lower decoding complexity than the SSD, and achieves a near-ML performance The inventive preprocessing scheme can further reduce the decoding complexity of the proposed decoder especially for a large constellation size. In the case of 64-QAM and 4×3 MIMO, the decoding complexity of the inventive decoder can save up to 76% compared to SSD. If the inventive preprocessing is used, the decoding complexity of the inventive decoder can save up to 79% compared to SSD.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A decoding method applying to a slab decoder in underdetermined MIMO system, comprising the steps of:
   obtaining a plurality of candidate points by a slab of the slab decoder, wherein the slab decoder performs the steps of:
   (1) arbitrarily assigning an initial point, wherein the initial point has a plurality of corresponding dimensions;
   (2) adding the initial point into a first set of points and a second set of points, setting the initial point as a temporary point, and deleting the initial point from the first set of points;
   (3) determining whether the first set of points doesn't have any points and all the corresponding dimensions of the temporary point are searched, if yes, all points in a third set of points are set as the candidate points, otherwise, implementing step (4);
   (4) deriving all legitimate points between an upper bound and a lower bound of the slab in a corresponding dimension of the temporary point, wherein the corresponding dimension of the temporary point is not represented as searched, the upper bound and the lower bound of the slab of the slab decoder is calculated according to the temporary point, received signals and channel of the underdetermined MIMO system, and a radius of the slab decoder performed, and each of the legitimate points has a plurality of corresponding dimensions;
   (5) determining whether each of the legitimate points exists in the set of the second set of points, respectively, if no, adding the legitimate point into the first set of points, the second set of points, and the third set of points, and representing the corresponding dimension of the legitimate point is searched, otherwise, only representing the corresponding dimension of the legitimate point is searched, wherein the corresponding dimension of the legitimate point, which is represented, is corresponded to the corresponding dimension of the temporary point;
   (6) calculating a corresponding distance of each of the legitimate points according to the temporary point, received signals and channel of the underdetermined MIMO system, and the radius of the slab decoder performed;
   (7) deriving two extra candidate points according to the upper bound and the lower bound, wherein one of the two extra candidate points is located upper the upper bound with a distance, the other is located lower the lower bound with the distance, the distance is the smallest distance between coordinate points;
   (8) determining whether each of the two extra candidate points exists in the set of the second set of points, if no, adding the extra candidate points into the first set of points, the second set of points, and representing the corresponding dimension of each of the extra candidate point is searched, otherwise, only representing the corresponding dimension of each of the extra candidate point is searched, wherein the corresponding dimension of each of the extra candidate point, which is represented, is corresponded to the corresponding dimension of the temporary point;
   (9) determining whether all the dimension of the temporary point is searched, if yes, selecting one point of the first set of points to be the temporary point, deleting the point selected from the first set of points, and going back to step (3), otherwise, going back to step (3); and
   using the slab decoder to obtain an estimate of a transmitted signal of the underdetermined MIMO system by conducting an intersectional operations with a dynamic radius of the slab decoder performed adaptation to the plurality of candidate points.

2. The decoding method of claim 1, further comprising the steps of reordering a channel matrix of the underdetermined MIMO system.

3. A slab decoder applying in underdetermined MIMO system for performing the decoding method of claim 1.

4. A decoding method applying to a slab decoder in underdetermined MIMO system, comprising the steps of:
   obtaining a plurality of candidate points by a slab of the slab decoder, wherein each of the candidate points has a corresponding distance, the slab decoder has a plurality of slabs; and
   using the slab decoder to obtain an estimate of a transmitted signal of the underdetermined MIMO system by conducting an intersectional operation with a dynamic radius of the slab decoder performed adaptation to the plurality of candidate points, wherein the slab decoder performs the steps of:

(1) using another one slab of the slab decoder to find an upper bound and a lower bound of the slab decoder corresponding to the candidate points according to the candidate points, a received signals of the underdetermined MIMO system, a radius of the slab decoder performed, and the corresponding distances, and renewing the corresponding distances according to the candidate points and the received signals of the underdetermined MIMO system;

(2) conducting the intersectional operation on the candidate points and the range between the upper bound and the lower bound of the slab decoder to delete the candidate points outside the range between the upper bound and the lower bound;

(3) replacing the radius of the slab decoder performed if a minimum value of the corresponding distance is smaller than the radius of the slab decoder performed;

(4) determining whether all the slabs of the slab decoder are used, if no, going back to step (1), otherwise, setting a candidate point of the candidate points to be the estimate of the transmitted signal of the underdetermined MIMO system, wherein the corresponding distance of the candidate point is small than that of the other candidate points.

5. The decoding method of claim 4, further comprising the steps of reordering a channel matrix of the underdetermined MIMO system.

6. A decoding method applying to a slab decoder in underdetermined MIMO system, comprising the steps of:

using the slab decoder to reorder a channel matrix of the underdetermined MIMO system by a QR decomposition for choosing an initial slab, wherein the slab decoder performs the steps of:

(1) performing the QR decomposition of the channel matrix H by $$V_1 H = \begin{bmatrix} T_1 & A \\ 0 & \tilde{H}_1 \end{bmatrix},$$

where $V_1$ is an M×M Householder matrix of the first column vector of H, $T_1$ is a scalar and $\tilde{H}_1 = V_1[2:M,1:M] H[1:M,2:M]$, and defining a new matrix as $\tilde{H}_1 \in R^{M-1 \times M-1}$ to perform the same procedure as $$V_2 \tilde{H}_1 = \begin{bmatrix} T_2 & A \\ 0 & \tilde{H}_2 \end{bmatrix},$$

where $V_2$ is an (M−1)×(M−1) Householder matrix of the first column vector of $\tilde{H}_1$, $T_2$ is scalar and $\tilde{H}_2 = V_2[2:M-1,1:M-1] \tilde{H}_1[1:M-1,2:M-1]$, and so on, whereby $Q^T H = R$ is obtained, where $$Q^T = \begin{bmatrix} \vec{q}_1^T \\ \vec{q}_2^T \\ \vdots \\ \vec{q}_M^T \end{bmatrix} = U_{M-1} \ldots U_2 U_1$$

where which is an M×M unitary matrix, "R" is an upper triangular matrix corresponding to the QR decomposition of the channel matrix, and $$U_i = \begin{bmatrix} I & 0 \\ 0 & V_i \end{bmatrix};$$

(2) computing the last row of $U_{M-1}$ to yield to the following:

$$\begin{bmatrix} \otimes \\ \vdots \\ \otimes \\ \vec{q}_M^T \end{bmatrix} = \begin{bmatrix} I & 0 & 0 \\ 0 & \otimes & \otimes \\ 0 & V_{M-1(2,1)} & V_{M-1(2,2)} \end{bmatrix} \Omega_1,$$

where $\Omega_1 = U_{M-2} \ldots U_1$, and computing the last two rows of $U_{M-2}$ as $$\Omega_1 = \begin{bmatrix} I & 0 & 0 & 0 \\ 0 & \otimes & \otimes & \otimes \\ 0 & V_{M-2(2,1)} & V_{M-2(2,2)} & V_{M-2(2,3)} \\ 0 & V_{M-2(3,1)} & V_{M-2(3,2)} & V_{M-2(3,3)} \end{bmatrix} \Omega_2,$$

where $\Omega_2 = U_{M-\ldots} U_1$, and so on, whereby the last vector $\vec{q}_M$ of the M×M unitary matrix with a permutation matrix of the channel matrix is an unitary matrix is obtained; and (3) choosing an initial slab according to a received signal of the underdetermined MIMO system and the M×M unitary matrix;

obtaining a plurality of candidate points efficiently by the initial slab of the slab decoder; and using the slab decoder to obtain the estimate of a transmitted signal of the underdetermined MIMO system by conducting an intersectional operation with a dynamic radius of the slab decoder performed adaptation to the plurality of candidate points.

7. A decoding method applying to a slab decoder for underdetermined MIMO system, comprising the steps of:

using the slab decoder to reorder a channel matrix of the underdetermined MIMO system by a QR decomposition for choosing an initial slab, wherein the slab decoder performs the steps of:

(1) providing the channel matrix having a plurality of column vectors and setting a vector set consisted of the plurality of column vectors;

(2) normalizing a column vector of the vector set as a normalized column vector, wherein a correlation of the column vector with received signals of the underdetermined MIMO system is lower than the correlation of each of other column vectors of the vector set with the received signal;

(3) discarding the column vector from the vector set, updating the vector set by $\vec{h}_i = \vec{h}_i - \vec{h}_i \cdot \vec{q}_k$, wherein, $\vec{h}_i$ is each of the other column vectors of the vector set and $\vec{q}_k$ is the normalized column vector, and going back to step (2) till the number of the normalized column vector is equal to the number of slabs of the slab decoder;

(4) arranging the normalized column sequentially to obtain a lower triangular matrix corresponding to the QR decomposition of the channel matrix and obtaining an upper triangular matrix by operating the channel matrix and the lower triangular matrix to reorder the channel matrix;

obtaining a plurality of candidate points efficiently by the initial slab of the slab decoder according to received signals and the channel matrix of the underdetermined MIMO system, and a radius of the slab decoder performed; and using the slab decoder to obtain an estimate of a transmitted signal of the underdetermined MIMO system by conducting an intersectional operation with a dynamic radius of the slab decoder performed adaptation to the plurality of candidate points.

* * * * *